United States Patent [19]

Shamie

[11] Patent Number: 4,529,219
[45] Date of Patent: Jul. 16, 1985

[54] FOLDABLE BABY CARRIAGE WITH SECURITY LOCK

[76] Inventor: Louis Shamie, 972 Dean St., Brooklyn, N.Y. 11233

[21] Appl. No.: 559,765

[22] Filed: Dec. 9, 1983

[51] Int. Cl.³ .............................................. B26B 7/08
[52] U.S. Cl. .................................. 280/642; 280/650; 280/658; 403/160
[58] Field of Search .............. 280/642, 644, 649, 650, 280/657, 658; 297/16, 46, 56; 403/92, 93, 94, 96, 160; 108/131

[56] References Cited

U.S. PATENT DOCUMENTS 2,013,910 9/1935 Burst .................................. 280/642

FOREIGN PATENT DOCUMENTS 1962706 2/1973 Fed. Rep. of Germany ...... 280/649

Primary Examiner—David M. Mitchell
Assistant Examiner—Richard Camby
Attorney, Agent, or Firm—McGlew and Tuttle

[57] ABSTRACT

A foldable carriage with security lock includes a plurality of members which are pivotally connected to each other and can be folded from an open to a closed position. One of the members includes a pivotally mounted latch which can engage a pin on another one of the members to hold the carriage in its open unfolded position. The latch is provided with a locking element which engages the other member so that the latch cannot be rotated to disengage the pin, unless the locking element is purposely retracted.

14 Claims, 6 Drawing Figures

FOLDABLE BABY CARRIAGE WITH SECURITY LOCK

FIELD AND BACKGROUND OF THE INVENTION

The present invention relates in general to baby carriages or strollers, and in particular to a new and useful carriage which includes a foldable frame and a security lock for preventing inadvertant folding of the frame.

Strollers or baby carriages are known which have foldable frames of various configurations which are capable of being folded into a smaller size for easy carrying.

A latch of some sort is usually provided which holds the baby carriage in its open or unfolded position. This latch can be activated or released to permit folding of the carriage frame. By design or after repeated use, it becomes increasingly easier to fold the baby carriage into its closed or folded configuration. An accidental movement of the latch may thus result in an undesired folding of the carriage, when for example an infant is sitting in the carriage.

SUMMARY OF THE INVENTION

The present invention is directed to a security lock for a baby carriage having a foldable frame which requires the purposeful unlocking of the latch before it can be moved to permit folding of the carriage frame.

Accordingly, an object of the present invention is to provide a carriage having a foldable frame and lock combination which comprises a first frame member, a second frame member, a cross member pivotally connected to the first and second frame members, the first, second and cross members being moved between an open and a closed position. In the open position the first and second frame members are spaced from each other. In the closed position, which requires movement of the cross member in a closing direction, the first and second frame members are positioned adjacent each other to reduce the overall volume of the carriage. A latch is pivotally connected to the first or cross member with a latch engagement means connected to the other of the first and cross members that is engaged with the latch to hold the carriage in its open position. With movement of the latch to disengage it from its engagement means, the frame may be folded into its closed position. In the open position, the first and cross members both have portions which are adjacent each other. The latch and latch engagement means are connected to these adjacent portions of the first and cross member. A locking element is movably mounted to the latch from a first position which engages the mentioned portion of the first or cross member, and a second position which is disengaged from that portion. Biasing means are provided for biasing the locking element into its first or engaging position. An actuator is also provided for moving the locking element into its second position. The actuator has a quasi-stable position when it has disengaged the locking element from the mentioned portion so that any abrupt motion or an appropriate engagement of the actuator with a selected frame member will cause the locking element to return to its first position so that it is ready to reengage the first or cross members when the carriage is unfolded into its open position.

A further object of the invention is to provide a carriage and security lock combination which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

Figure 1:
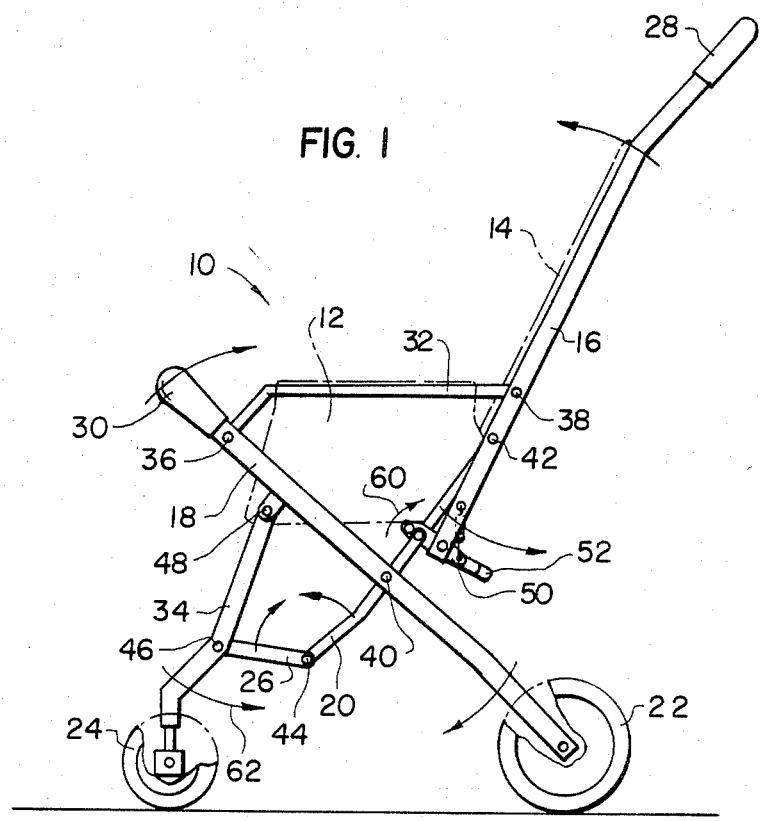
FIG. 1 is a side elevational view of a carriage having a foldable frame which is provided with the inventive security lock arrangement.

Referring to the drawings in particular, a carriage having a foldable frame of the type utilized in the invention is shown in FIG. 1. The carriage frame 10 which is foldable supports a seat shown in phantom line having a back 14 supported by a first frame member 16 and a seat with sides 12 supported by a pair of arm members 32 (one of which is shown) on either side of the carriage frame 10. A second frame member 18 is pivotally mounted to the two arms 32 at pivot point 36. Frame members 16 and 18 are both U-shaped so that they have one leg on each side of the carriage frame. The lower end of each leg of second frame member 18 rotatably receives an axle of a pair of rear wheels 22.

The two legs of first frame member 16 are pivotally connected to an opposite end of each arm member 32 at pivot point 38.

A cross member 20, 26 is pivotally mounted at pivot points 40 and 42 between first and second members 16 and 18. The cross member is itself foldable at pivot point 44 and formed of a cross link 20 and a connecting link 26.

The carriage frame 10 is a front frame member 34 which is pivotally mounted at 48 to second frame member 18 and pivotally mounted at 46 to link 26. The carriage frame includes two front frame members 34, one on each side of the frame, each of which pivotally and rotatably carries one or more front steering wheels 24.

The U-shaped first frame member 16 carries at its top a handle 28 and the second U-shaped frame member 18 carries at its top a padded cross rail 30.

Pivotally mounted to the lower end of first frame member 16 is a latch 50 having an actuator bar 52 which extends across the width of carriage frame 10. Two links 50 are provided, one for each leg of frame member 16, and bar 52 is connected to both of these links.

Figure 2:
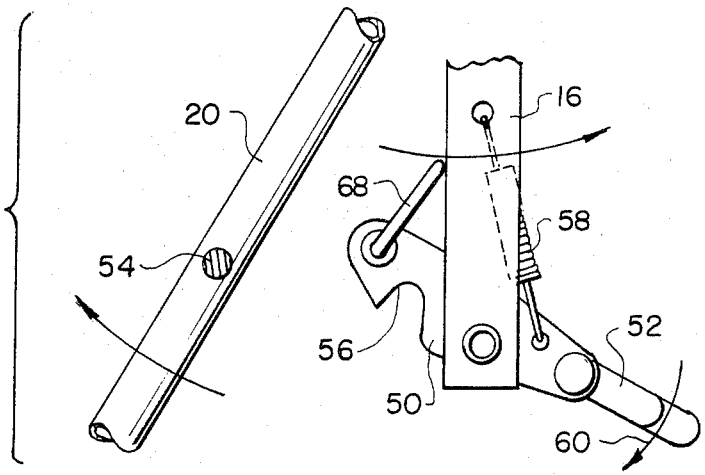
FIG. 2 is a partial view, on an enlarged scale of the carriage shown in FIG. 1, in the latch and lock area, an instant after the latch has been disengaged and the frame begins movement to its closed position.
Figure 3:
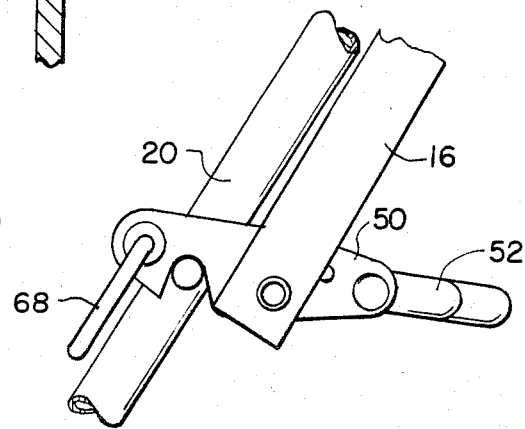
FIG. 3 is a view similar to FIG. 2 of this same area of the carriage in its secured and locked open position.

Link 50 includes a recess or hook 56 shown in greater detail in FIGS. 2 and 3, which hooks latch engagement means in the form of pin 54 to hold the frame in its open or unfolded position shown in FIG. 1.

A spring 58 is connected between latch 50 and member 16 to hold hook 56 into engagement with pin 54.

When latch 50 is rotated in the direction of arrow 60 the carriage frame can be moved into its closed position. To accomplish this first frame member 16 is rotated counterclockwise with respect to pivot point 38 and 42. Second frame member 18 rotates clockwise with respect to pivot points 36 and 40. Front frame member 34 rotates in the direction of arrow 62 and the cross and connecting links 20 and 26 rotate with respect to pivot point 44 toward each other. In the folded or closed position of carriage frame 10, members 16, 18 and 34 lie substantially parallel and adjacent each other to form a very compact configuration.

Figure 4:
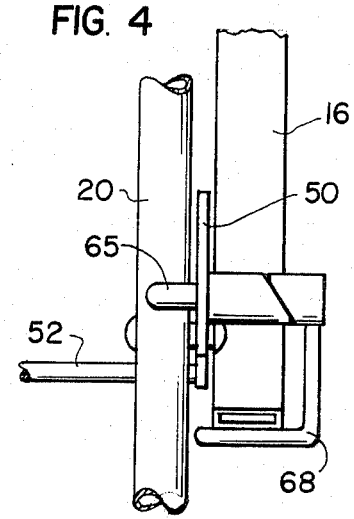
FIG. 4 is a front view of the structure shown in FIG. 3 with the locking element in its engaged position and the latch engaged.
Figure 5:
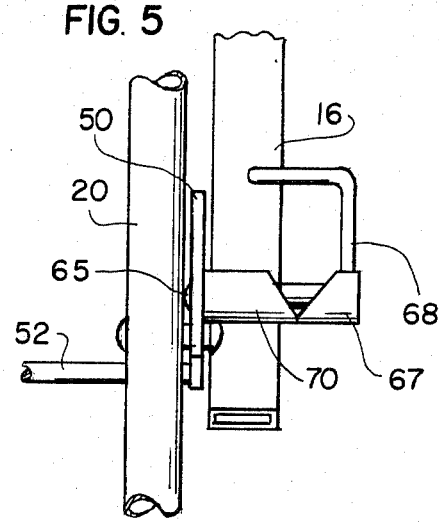
FIG. 5 is a view similar to FIG. 4 showing the locking element in its disengaged position which permits movement of the latch.
Figure 6:
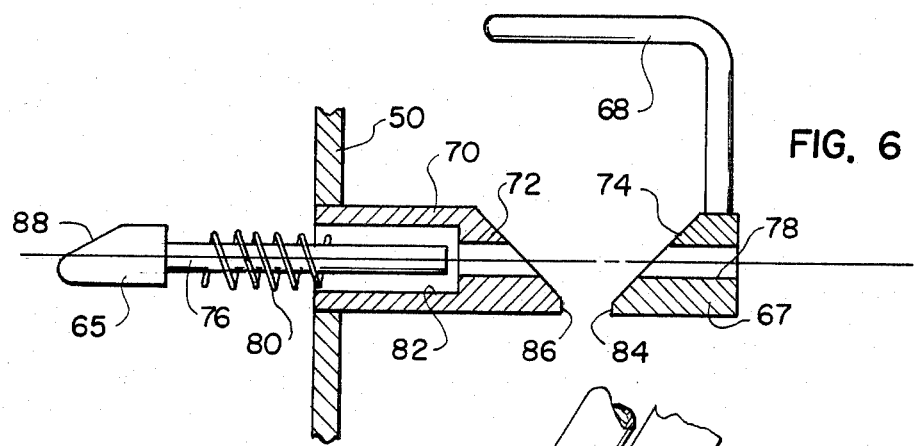
FIG. 6 is an exploded view of the security lock arrangement.

To prevent the inadvertant disengagement of latch 50 from pin 54, and in accordance with the invention, a security lock illustrated best in FIGS. 4, 5 and 6 is provided.

The security lock includes a locking member comprising a pin 64 which is movably mounted on the latch 50. In the latched and locked position as shown in FIG. 4, pin 64 extends over cross link 20 to prevent its movement in a closing direction for closing the frame. This movement is normal and up away from the page in FIG. 4. The engagement of pin 64 over the top of cross link 20 also prevents the rotation of link 50 in the direction of arrow 60.

To permit folding of the carriage frame, an actuator head 67 which is fixed to pin 65 is rotated with the aid of an actuator arm 68 into the position shown in FIG. 5. This causes the withdrawal or retraction of pin 65 away from link 20 and into its sleeve 70. As best shown in FIG. 6, sleeve 70 and actuator head 67 are both provided with beveled surfaces 72 and 74. Upon relative rotation of actuator head 67 with respect to sleeve 70, pin 65 is pulled to the right. Pin 65 includes a stem 76 which is fixed in a bore 78 of actuator head 67. Biasing means in the form of spring 80 is engaged around stem 76 and seated in recess 82 of sleeve 70 to bias pin 65 into its first engaging position shown in FIG. 4. The rotation of actuator head 67 with arm 68 acts against the bias of spring 80 through the aid of beveled surfaces 72, 74.

When in the position shown in FIG. 5, flat stop surfaces 84 and 86 of beveled surfaces 72 and 74 engage each other. This establishes a quasi-stable position for the actuator head and arm. Any slight rotation of arm 68 dislodges surfaces 84 and 86 from each other and, due to the bias of spring 80, snaps pin 65 back to its first engaging position. This dislodging of the actuator from its quasi-stable position can be achieved either due to any abrupt motion of the carriage either when it is unfolded or folded due to the inertia of arm 68.

A more positive release of pin 65 is achieved by selecting the length of arm 68, as shown in FIG. 2, to engage first frame member 16 after latch 50 has been rotated sufficiently to disengage hook 56 from pin 54. With this engagement arm 68 rotates sufficiently to disengage stop surfaces 84, 86 from each other and return the locking member to its first engaging position. Since the carriage is moving into its unfolded position, however, the latch does not yet engage the cross link 20. To permit engagement of pin 65 over cross link 20, pin 65 is provided with a beveled surface 88, facing link 20.

While a specific embodiment of the invention has been shown and described in detail to illustrate the application of the principles of the invention, it will be understood that the invention may be embodied otherwise without departing from such principles.

What is claimed is:

1. A carriage having a foldable frame and lock combination, comprising:
   a first frame member;
   a second frame member;
   a cross member pivotally connected to said first and second frame members at pivotal connections therewith;
   said first, second and cross members movable between a first position with said first and second members spaced from each other and with a portion of said cross member disposed adjacent a portion of said first member which is spaced from the pivotal connection between said first and cross members, and a closed position with said first and second members disposed adjacent each other and said portions of said first and cross members spaced from each other, said cross member moving in a closing direction with movement from said open to said closed position;
   a latch pivotally connected to one of said first and cross members at said portion thereof;
   engagment means connected to the other of said first and cross members adjacent said portion thereof, engaged with said latch to hold said first, second and cross members in said open position, and disengaged from said engagement means in said closed position;
   a locking element movably mounted to said latch and having a first position engaging said portion of said other of said first and cross members to prevent movement of said cross member in said closing direction to prevent movement from said open to said closed position, said locking element having a second position disengaged from said portion of said other of said first and cross members;
   biasing means connected to said locking element for biasing said locking element toward said first position thereof; and
   an actuator connected to said locking element for moving said locking element from said first to said second position thereof against the bias of said biasing means to permit movement from said open to said closed position.

2. A carriage and lock combination according to claim 1, wherein said actuator is movable into a quasi-stable position for moving said locking element to said second position thereof, said actuator being moved away from said quasi-stable position to permit said biasing means to return said locking element to its first position upon the occurrence of a selected portion of motion between said open and closed positions.

3. A carriage and lock combination according to claim 2, including a sleeve connected to said latch, said locking element axially movable and rotatable in said sleeve, said actuator connected to said locking element including an actuator head and an actuator arm extending outwardly of said actuator head, said sleeve and said actuator head including opposed beveled surfaces which, with rotation of said actuator head cause movement of said locking element from its first to its second position, at least one of said beveled surfaces including a stop surface for establishing said quasi-stable position with said locking element in its second position.

4. A carriage and lock combination according to claim 3, wherein said latch is pivotally connected to said first frame member, said engagement means being connected to said cross member, said actuator arm having a lenght and shape so as to engage said first frame member when said locking element is in its second position and with movement of said first frame member with movement from said open toward said closed position.

5. A carriage and lock combination according to claim 4, wherein said latch includes a recess, said engagement means comprising a pin.

6. A carriage and lock combination according to claim 5, wherein said biasing means comprises a spring seated in said sleeve.

7. A carriage and lock combination according to claim 6, wherein said actuator arm is L-shaped having a first leg connected to said actuator head and a second leg extending toward said latch.

8. A carriage and lock combination according to claim 1, including a front frame member pivotally connected to said second frame member, a connecting link pivotally connected between said cross member and said front frame member and an arm member pivotally connected between said first and second frame members above the pivotal connection of said first and second frame members to said cross member, said latch pivotally mounted to a lower end of said first frame member and said engagement means comprising a pin connected to said cross member.

9. A carriage and lock combination according to claim 8, including at least one rear wheel connected to a lower end of said second frame member, at least one front wheel connected to a lower end of said front frame member, said pivot point between said second member and said cross member being at an intermediate location on both of said second frame member and said cross member and said front frame member being pivotally connected to said second frame member at a location above said cross member.

10. A carriage and lock combination according to claim 9, including a sleeve connected to said latch, said locking element pivotally and axially movable in said sleeve, said biasing means comprising a spring engaged between said locking element and said sleeve disposed in said sleeve, said actuator comprising an actuator head connected to said locking element and an actuator arm connected to and extending outwardly of said actuator head.

11. A lock arrangement comprising:
a sleeve having an inclined surface at one end thereof and an opposite end;
a locking pin slidably mounted in said sleeve having an end movable out of said opposite end of said sleeve;
biasing means engaged between said sleeve and said locking pin for biasing said locking pin out of said opposite end of said sleeve;
a positioning head connected to said locking pin on a side of said sleeve adjacent said inclined surface, said head including a further inclined surface shaped to mate with said inclined surface of said sleeve, said positioning head with connected locking pin being rotatable and axially movable with respect to said sleeve for mating and mis-mating said inclined surfaces, said locking pin being pulled against a bias of said biasing means when said inclined surfaces are mis-mated by rotation of said positioning head with respect to said sleeve; and
means for establishing a quasi-stable position with said inclined surfaces mis-mated so that only slight rotational force on said positioning head will cause said positioning head and locking pin to rotate to bring said inclined surfaces into a mating position.

12. An arrangement according to claim 11, wherein said means comprise small flattened areas on said sleeve and said positioning head adjacent said inclined surfaces thereof which can engage each other for establishing said quasi-stable position.

13. An arrangement according to claim 11, wherein said locking pin includes a large diameter outer portion and a small diameter inner portion connected to said positioning head, said biasing means comprising a spring disposed in said sleeve and around said small diameter inner portion.

14. An arrangement according to claim 11, including an L-shaped arm connected to said positioning head having a first arm portion extending radially of said positioning head and a second arm portion extending axially of said locking pin and toward said sleeve.

* * * * *